2,921,909

SUBSTITUTED CARBAMIDE DETERGENT COMPOSITION

Lloyd I. Osipow, Monsey, and William C. York, Westbury, N.Y.; Ruth M. York, administratrix of said William C. York, deceased, assignors to W. R. Grace & Co., New York, N.Y., a corporation of Connecticut No Drawing. Application June 5, 1957
Serial No. 663,581

10 Claims. (Cl. 252—137)

This invention relates to detergent compositions. In one specific aspect, it relates to combinations of common detergent builders and monoacyl derivatives of substituted carbamides. In another aspect, it relates to novel built detergent compositions containing fatty acid monoesters of N-urea glucoside.

In our copending application S.N. 663,621, filed June 5, 1957, we have disclosed a novel class of chemical compounds characterized by the structural formula:

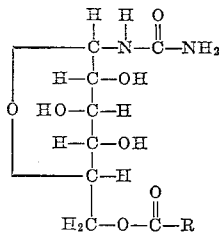

In the above formula, R is a hydrocarbon residue of the formula $C_nH_m$ where $n$ is an integer of at least 7 and not more than 23 and $m$ is an integer in the range between $2n-3$ and $2n+1$ inclusive. Thus, R is an alkyl, alkenyl or alkadienyl radical having from 7 to 23 carbon atoms. Generically, our new compounds are described as the monofatty acid esters of N-urea glucoside. Typical novel N-urea glucoside esters embraced by the present invention include the capyrylate, pelargonate, caprate, undecanoate, laurate, tridecanoate, myristate, pentadecanoate, palmitate, margarate, stearate, nonadecanoate, arachidate, heneicosanoate, behenate, tricosanoate, lignocerate, oleate, palmitoleate, petroselinate, erucate, linoleate, eleosterate, and the like. Suitable esters also include mixtures of those enumerated hereabove. For example, the N-urea glucoside esters of coconut oil, palm oil, tall oil, olive oil, soybean oil and tung oil are also useful.

Our novel compounds are prepared by a new alcoholysis reaction between N-urea glucoside and an ester of a fatty acid of the general formula:

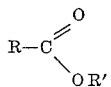

R has the meaning hereinbefore described. R' is an organic moiety. In a preferred embodiment, R' is a lower alkyl radical; i.e., up to and including hexyl. The lower alkyl esters of the fatty moieties of the above formula are suitable for the alcoholysis reaction, since they result in the formation of an alcohol sufficiently volatile to permit its removal from the mixture by simple distillation as the reaction progresses. Since alcoholysis is an equilibrium reaction, it follows that some N-urea glucoside monoester is formed whether or not the by-product alcohol is separated. Thus any organic ester of a fatty acid is suitable in the present process including those such as glycerides which are less volatile than the solvent selected for the reaction medium. The impediment to rapid reaction is the removal of the alcohol. Consequently, the reaction is faster if a more volatile alcohol is used. Under the preferred conditions of temperature and pressure, the alcohol can be conveniently stripped free of the reaction mixture by using reduced pressure to aid distillation of the alcohol therefrom or by blowing an inert gas through or over the surface of the reaction mixture.

Suitable solvents for the novel alcoholysis reaction are those which will dissolve both N-urea glucoside and the starting ester without preferential reaction with either of the products or the reactants. In the preferred embodiment we used dimethylsulfoxide, monomethylformamide, or formamide.

The novel reaction is effectively catalyzed by an alkaline catalyst. By the term "alkaline catalyst" we mean a basic organic salt or a salt of a metal selected from Groups I, II or IV of the Periodic Table and a weak acid. Proton-accepting metals such as tin and zinc are also embraced by the term "alkaline catalyst." Likewise, quaternary ammonium bases and similar compounds are effective for this purpose. Exemplary catalysts include sodium hydroxide, potassium hydroxide, sodium carbonate, sodium methoxide, potassium ethoxide, trisodium phosphate, lithium hydroxide, magnesium hydroxide and lead oxide.

Specific working examples for the preparation of the individual N-urea glucoside mono-fatty esters are given later in the specification.

The N-urea glucoside mono-fatty esters made by this process are effective as cleaning agents per se. We have discovered that these novel esters form synergistic combinations with common builders to produce superior detergents.

It is well known to combine a surface active agent with an alkali salt of a weak inorganic acid, a neutral inorganic salt and a deflocculating agent to produce a detergent composition. However, the effectiveness of a particular composition depends upon balance between the above ingredients and furthermore, the synergistic interaction between the active agent and the building materials. We have discovered such an improved combination. The N-urea glucoside monofatty ester detergents, when combined in proper portion with building materials, form a truly superior detergent composition which is astonishingly effective both in hard and soft water. The basic composition may be varied to provide novel detergent compositions effective for both light duty and heavy duty purposes.

It is, therefore, an object of the present invention to provide novel detergent compositions which represent a marked improvement in the field of nonionic built detergents.

For the purpose of our novel composition, we have found it especially desirable to incorporate a major portion of inorganic water soluble phosphates. Phosphates which are suitable include, but are not limited to, sodium tripoly-phosphate, tetrasodium pyrophosphate, trisodium orthophosphate and sodium hexametaphosphate. In preparing our heavy duty detergent compositions we prefer to use a substantial portion of sodium tripolyphosphate.

For heavy duty detergency the percentage of inorganic phosphates in the composition may vary from about 10–80%. We find that the preferred range is about 30–60%. Within this range optimum effect is achieved between the phosphate ingredient and our novel N-urea glucoside ester. Alkali metal silicates also are effective as building materials for the purposes of the present invention. Suitable compounds within this category include sodium silicate and sodium metasilicate pentahydrate. The silicates in solution undergo hydrolysis to give a pH of about 11.2. In our compositions we may have from about 5–25% of the alkali metal silicate, although the preferred quantity is from about 10–15%. A sodium salt of a strong inorganic acid is an important building material for our novel detergent compositions. Such a salt does not hydrolyze but it dissociates to a sufficient extent to provide sodium ion in the detergent solution. For a light duty detergent where a less alkaline medium is desired we find that sodium sulfate in quantities from about 50–85% is desirable. 5–30% of this material is generally incorporated in our novel heavy duty detergents. A small quantity of an alkali metal carbonate such as sodium carbonate is also desirable as a building material. While the N-urea glucoside monoesters tend to act per se as dispersants or deflocculents, we have found that it is desirable to bolster their natural propensity to deflocculate by the addition of a minor portion ranging from about 0.5 to 2% of sodium carboxymethyl cellulose.

The amount of N-urea glucoside monoester in the detergent composition is generally minor in proportion to the weight of the builders. Generally, the proportion of the monoester to the builders ranges from about 1:49 to about 1:1. Under preferred conditions the novel urea ester detergent comprises from about 15–30% by weight of the total composition. The optimum amount of this active ingredient will vary according to the specific building materials, the contemplated field of application, and the manner of use.

The general procedures for preparing our novel compositions are as follows: The builders may be added to the urea detergent to form a hot aqueous slurry containing from about 40–60% solids concentration. This mixture is vigorously stirred to form a smooth and homogeneous paste. To form the slurry, the additives may be dissolved in a suitable solvent and added to a slurry of the monoester, or alternatively, a mixture or emulsion of the builders in water with a minor portion of the urea detergent may be put simultaneously into the slurry. The builder may also be incorporated in the detergent composition by a post treatment of dried detergent particles.

Thereafter these compositions may be prepared in forms of solutions, pastes, or as dry, partially hydrated solid products, preferably in a finely divided condition. If a solution of the detergent composition is prepared it may be subjected to suitable drying operations and converted into particulate form, e.g., the mixture may be spray dried, drum dried or roll dried at temperatures of about 200°–350° F.

In order for a composition to be an excellent detergent, it must have (1) ability to wet and spread on liquid and solid surfaces, (2) ability to form a low and stable foam, (3) ability to emulsify oily materials, (4) ability to peptize aggregates of solid particles and (5) ability to defloccuate or stabilize disperse systems of solid particles. The novel N-urea glucoside monoesters per se possess these characteristics to a measurable extent. However, as an active agent in the detergent compositions described hereabove, these desirable properties of the urea detergents are considerably enhanced. The effectiveness of the novel monoesters as part of a composition is further discussed in connection with the standard commercial detergent evaluation tests which appear in the examples infra. We have observed a tendency of the alkaline building material to cause saponification by a cleavage of fatty esters within the detergent solutions during use. The soap thus formed is disposed of within the soil which is being removed by the detergent. Builders by themselves are not particularly effective emulsificants. The presence of the novel N-urea glucoside esters and the saponification products resulting from chemical reaction within the detergent solution causes our novel built compositions to have superior emulsification properties. This is especially important in carrying away the water insoluble inert organic material such as hydrocarbon oils, asphalt and tar from the surface of the material to be cleaned. The ability to disperse and defloccuate soil particles possessed by our novel ester is supplemented by the presence of sodium carboxymethyl cellulose in our novel heavy duty detergents. Because of this property our novel compositions effectively sequester calcium and magnesium ions in hard water and prevent redeposition of their soaps on the surface of the material being treated.

The scope and utility of the present invention is further illustrated by the following examples.

EXAMPLE I

A detergent composition was prepared by forming a 60% solids slurry containing on a solids basis about 40% of sodium tripolyphosphate, about 10% tetrasodium pyrophosphate, about 10% sodium metasilicate pentahydrate, about 19.5% sodium sulfate, about 20% N-urea glucoside myristate and about 0.5% sodium carboxymethyl cellulose. This slurry was vigorously agitated about 140° F. to form a homogeneous mixture. It was then dried with heated air at a temperature of about 350° F. with the resultant moisture loss of about 40%. The resulting composition was recovered as a powder which possessed a high grade of detersive and foaming properties in both hard and soft water. The resulting detergent is remarkably effective for heavy duty, viz: treating e.g. soiled cotton.

EXAMPLE II

The procedure of Example I was substantially repeated using various N-urea glucoside monoesters to form the compositions. Built detergents containing N-urea glucoside laurate, cocoate, palmitate, oleate, stearate, and tallowate were thus prepared.

EXAMPLE III

A detergent composition was prepared by the procedure of Example I using about 25% N-urea glucoside myristate and about 75% sodium sulfate on a solids basis. The resulting detergent is extremely effective for light duty, viz: treating e.g. soiled wool.

EXAMPLE IV

The procedure of Example III was substantially repeated to form light duty detergents containing about 25% of the following active agents: N-urea glucoside laurate, cocoate, palmitate, oleate, stearate, and tallowate.

EXAMPLE V

*Detergency evaluation*

It has been previously indicated that detergency depends upon a variety of factors; viz: wetting power, emulsification, dispersion, and defloccuation. The following experiment was conducted to ascertain the detergent action of the novel N-urea glucoside esters in a built detergent system.

A sample of "Foster D. Snell" soiled cotton was selected for the evaluation of the heavy duty detergents. This test sample was prepared by treating de-sized Indian Head cotton fabric with a soiling mixture containing 28.4% carbon, 35.8% coconut oil, 17.9% coconut oil fatty acids and 17.9% mineral oil suspended in carbon tetrachloride. The Indian Head cotton fabric was dipped into the suspension, air dried and rinsed lightly in water to remove loosely adherent soil. It was again air dried. A test sample of Foster D. Snell soiled wool, selected for evaluation of the light duty detergents, was prepared as follows: Sheets of Botany Mills virgin wool were scoured in a washing machine at 43° C. for 15 minutes using an aqueous solution of a commercial detergent. The wool was thereafter rinsed, using three changes of water with constant agitation for 15 minutes at 43° C. for each change. A standard soiling mixture was prepared by homogenizing 17 g. of a standard soil (comprising 7.3 parts coconut oil fatty acids, 146 parts of coconut oil, 146 parts of defloccuated graphite and 1.1 parts of commercial detergent) in 50 ml. of water. The soil emulsion was dispersed in 3 liters of water; it was then added to a washing machine containing 23 sheets of the scoured rinsed wool and 10 gallons of water at 43° C. Ten minutes after the soil was added the machine was stopped and the water was allowed to drain off. The soiled wool was rinsed once for 5 minutes with 10 gallons of water at 43° C. and then hung up to dry in a dust-free room. The composition of the built detergents prepared according to the procedure of the foregoing examples is shown below in Table 1.

TABLE 1.—COMPOSITION OF BUILT DETERGENTS

|  | Type of Building | |
| --- | --- | --- |
|  | A, percent | B, percent |
| Active agent | 20.0 | 25.0 |
| Sodium tripolyphosphate | 40.0 |  |
| Tetrasodium pyrophosphate | 10.0 |  |
| Sodium metasilicate pentahydrate | 10.0 |  |
| Sodium sulfate | 19.5 | 75.0 |
| Sodium carboxymethyl cellulose | 0.5 |  |

Detergents were compared by running simultaneous wash tests in a standard laboratory detergency testing machine, e.g., of the Launderometer type. This machine rotates twenty jars end-over-end in a bath of fixed temperature. In each jar are placed standard soiled cloths, wash solution and rubber balls to provide "load." The test method gives useful comparative results provided, of course, that the detergents to be compared are run simultaneously and portions of the same batch of standard cloth are used. For check runs, the same series is repeated a second time and third time. The values for each detergent can be averaged and incidental variables will largely cancel out when the averages are compared. Such a system is called a group experiment. The test conditions used with heavy duty detergents are shown below in Table 2.

TABLE 2.—TEST CONDITIONS

| Amount of solution per jar | 100 ml. |
| --- | --- |
| Mechanical washing assistants | 8 rubber balls ⅜″ diameter. |
| Temperature | 60° C. |
| Speed of rotation of jars | 40 r.p.m. |
| Time for washing | 15 minutes. |
| Rinsing procedure | Rotate two minutes with 150 ml. of water of same hardness as wash water. |
| Fabrics per jar | Two swatches of "FDS" soiled cotton 3″ x 2″. |
| Reflectance reading | By a standard reflectance meter, e.g., a Hunter Multipurpose Reflectometer, set to read 100 on magnesia block. |

Detergents for light duty were tested using the above procedure substituting "FDS" soiled wool for the cotton and reducing the temperature to 43° C.

The esters of N-urea glucoside were compared with a polyoxyethylene ester of tall oil, a nonionic detergent sold commercially as "Sterox CD," which is commonly built for heavy duty household uses. Detergency data were obtained in both hard water of a hardness equivalent to 15 grains of calcium carbonate per gallon and soft water of a hardness equivalent to 2 grains per gallon. A U.S. grain of hardness is equivalent to 17.1 parts per million of calcium carbonate. Results for both heavy duty and light duty detergency evaluation appear below in Tables 3 and 4.

TABLE 3.—HEAVY DUTY DETERGENCY EVALUATION
[Soiled cotton washed at 60° C.]

| Active Agent (See Table 1) | Type of Building | Gain in Reflectance Units of Soiled Fabrics after Washing in Launderometer | | | |
| --- | --- | --- | --- | --- | --- |
|  |  | 2-Grain Water, Detergent Concentration | | 15-Grain Water, Detergent Concentration | |
|  |  | 0.25% | 0.35% | 0.25% | 0.35% |
| N-urea glucoside laurate | A | 9.7 | 14.8 | 6.6 | 12.2 |
| N-urea glucoside myristate | A | 4.5 | 9.3 | 3.8 | 5.8 |
| N-urea glucoside cocoate | A | 8.3 | 11.4 | 5.6 | 8.8 |
| N-urea glucoside palmitate | A | 5.1 | 5.8 | 4.5 | 4.6 |
| N-urea glucoside stearate | A | 5.0 | 7.9 |  | 5.5 |
| N-urea glucoside tallowate | A | 4.8 | 6.0 | 4.1 | 4.5 |
| Polyoxyethylene ester of tall oil | A | 2.5 | 4.4 | 3.8 | 3.5 |

TABLE 4.—DETERGENCY EVALUATION
[Soiled wool washed at 43° C.]

| Active Agent (See Table 1) | Type of Building | Gain in Reflectance Units of Soiled Fabrics after Washing in Launderometer | |
| --- | --- | --- | --- |
|  |  | 2-Grain Water, Detergent Concentration, 0.3% | 15-Grain Water, Detergent Concentration, 0.3% |
| N-urea glucoside laurate | B | 5.3 | 3.0 |
| N-urea glucoside myristate | B | 12.9 | 13.1 |
| N-urea glucoside cocoate | B | 7.5 | 5.9 |
| N-urea glucoside palmitate | B | 9.8 | 7.7 |
| N-urea glucoside stearate | B | 7.3 | 5.5 |
| N-urea glucoside tallowate | B | 3.6 | 1.9 |
| Polyoxyethylene ester of tall oil | B | 3.2 | 2.8 |

It is readily seen from the tables hereabove that the N-urea glucoside fatty acid esters in general are superior to the commercial detergent tested when built for both light and heavy duty detergency. In fact, the N-urea glucoside myristate appears to be an especially effective light duty detergent. Data also indicate that our novel built detergents are effective in both hard and soft water.

Specific examples for the preparation of the various N-urea glucoside mono-fatty esters referred to herein now follow.

EXAMPLE VI

*N-urea glucoside myristate*

A reaction apparatus was assembled by equipping a 3-necked flask with a stirrer and a ten-bulb fractionating column leading to a receiver. This flask was charged with 1.5 liters of dimethylsulfoxide, 333 g. (1.5 moles) of N-urea glucoside, 121 g. (0.5 mole) of methyl myristate, and 7 g. of potassium carbonate catalyst. The solution was heated to 90° C. under reduced pressure (15 mm. Hg) for 15 hours. The ten-bulb fractionating column permitted a partial fractionation of the distillate, which contained methanol and dimethylsulfoxide. A total of 600 ml. of distillate was collected during the entire period of the reaction. The reaction solution was cooled and the unreacted N-urea glucoside was recovered by filtration. To the clear filtrate were added 6.2 g. of acetic acid. This amount was just sufficient to neutralize any remaining potassium carbonate and convert any potassium soap formed to the free acid. The filtrate was mixed with 1 liter of butanol and 1 liter of concentrated aqueous NaCl solution. The resulting mixture was agitated in a separatory funnel, and the mixture was allowed to separate. The upper butanol layer (which contained the product) was separated and washed with 100 ml. of fresh NaCl solution. The washed butanol layer was decolorized with activated charcoal, then distilled in vacuo to a thick syrup. This syrup was then dissolved in 500 ml. of boiling ethanol. As the ethanol solution cooled, 21 g. of product separated. This was filtered and the filtrate was mixed with 1 liter of acetone. The resulting solution was chilled to −10° C. to precipitate a second portion of product weighing 81 g.

The novel product was purified by absorption chromatography. It melted at 165–168° C. and had a specific rotation $$\left[\alpha\right]\frac{22°C.}{D} = +12.9°$$

in dimethyl sulfoxide. A sample was analyzed and the composition checked with theory as follows: percent carbon, theory 58.3, found 57.3; percent hydrogen, theory 9.26, found 9.35; percent oxygen, theory 25.9, found 26.02; and percent nitrogen, theory 6.48, found 6.31. The structural formula of N-urea glucoside myristate is shown hereunder:

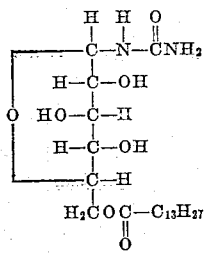

EXAMPLE VII

N-urea glucoside laurate

A 222 g. (1 mole) portion of N-urea glucoside was dissolved in 1.5 liters of dimethylsulfoxide containing 110 g. (0.5 mole) of methyl laurate. This solution was heated to 90° C. under reduced pressure (30 mm. Hg absolute) for one hour to remove any moisture that might have been present. The reaction flask was then equipped with a ten plate fractionating column. A 7 g. portion of anhydrous potassium carbonate was added as a catalyst and the solution was heated to 90° C. under 30 mm. Hg absolute pressure for 10 hours. Vapors passed through the fractionating column before reaching the receiver. The purpose of the fractionating column was to effect a partial separation of the methanol from the dimethylsulfoxide. At the end of the reaction 400–500 milliliters of distillate had been collected. The reaction solution was cooled, neutralized with glacial acetic acid, and diluted with equal volumes of butanol and NaCl solution. The upper butanol layer, after separation, was washed with a small quantity of fresh NaCl solution. The butanol layer was decolorized with activated carbon, dried over anhydrous sodium sulfate and distilled to a syrupy residue. This syrup was dissolved in 500 ml. of ethanol; the solution was diluted with 500 ml. of acetone, and the resulting solution was chilled to −15° C. The chilled solution was filtered to give 87 g. of N-urea glucoside laurate. The filtrate was concentrated to one-half its volume and rechilled to give 58 g. of a crude product, which was apparently composed of a mixture of mono- and di-esters. The first fraction of 87 g. was recrystallized from fresh ethanol-acetone mixture to give 61 g. of purified N-urea glucoside laurate.

The novel product was further purified by adsorption chromatography. It had a melting point of 170–176° C., and a specific rotation $$\left[\alpha\right]\frac{22°C.}{D} = +13.3°$$

in dimethyl sulfoxide. Upon analysis it was found to have the following composition as compared with theory: percent carbon, theory 56.5, found 56.34; percent hydrogen, theory 8.9, found 8.86; percent oxygen, theory 27.7, found 27.55; and percent nitrogen, theory 6.95, found 7.16.

EXAMPLE VIII

N-urea glucoside palmitate

The procedure of Example VI was substantially repeated using 135 g. (0.5 mole) of methyl palmitate. An 81 g. yield of N-urea glucoside palmitate was thereby obtained. After purification by adsorption chromatography the novel product was found to have a melting point of 150–162° C. and a specific rotation $$\left[\alpha\right]\frac{22°C.}{D} = +7.44°$$

in dimethyl sulfoxide. Upon analysis the following results were obtained: percent carbon, theory 60.0, found 61.28; percent hydrogen, theory 9.56, found 9.95; percent oxygen, theory 24.3, found 23.26; and percent nitrogen, theory 6.08, found 5.34.

EXAMPLE IX

N-urea glucoside cocoate

The procedure of Example VI was substantially repeated using 130 g. (0.5 mole) of methyl "cocoate." A 68 g. yield of the novel N-urea glucoside cocoate was thereby obtained. This new product was analyzed without purification and was found to contain 5% nitrogen (theory 6.45) and 51.6% fatty acid equivalent (theory 53%). The methyl "cocoate" comprises methyl esters of coconut oil fatty acid containing about 0.8% caproate, 5.4% caprylate, 8.4% caprate, 45.4% laurate, 18.0% myristate, 10.5% palmitate, 2.3% stearate, 0.4% arachidate, 7.5% oleate, and 0.4% palmitoleate. See Bailey, Industrial Oil and Fat Products, second edit., p. 135 (1951).

EXAMPLE X

N-urea glucoside tallowate

The procedure of Example VI was substantially repeated using 141 g. of methyl "tallowate" in lieu of the myristate. 81 g. of crude N-urea glucoside tallowate, specific rotation $$\left[\alpha\right]\frac{22°C.}{D} = +15.1°$$

in dimethyl sulfoxide, were thereby obtained. The crude material had a nitrogen content of 4.92% (theory 5.9%) and a fatty acid equivalent content of 61.8% (theory 57.0%). It was purified by adsorption chromatography and thereafter characterized by analysis. The "tallowate" is a mixture of tallow fatty acid methyl esters containing about 6.3% myristate, 27.4% palmitate, 14.1% stearate, 49.6% oleate, and 2.5% octadecadienoate. See Bailey, Industrial Oil and Fat Products, p. 147, supra.

EXAMPLE XI

N-urea glucoside oleate

The procedure of Example VI was substantially repeated using 150 g. of methyl oleate in lieu of the myristate. A 92 g. portion of N-urea glucoscide oleate was thereby obtained. This material has a specific rotation of $$\left[\alpha\right]\frac{25°C.}{D} = +8.5°$$

It was purified by adsorption chromatography and thereafter characterized. The pure product melted at 122–128° C. and had a specific rotation $$\left[\alpha\right]\frac{22°C.}{D} = +6.63°$$

in dimethyl sulfoxide. The purified N-urea glucoside oleate had the following composition: percent carbon, theory 61.72, found 59.45; percent hydrogen, theory 9.46, found 8.6; percent oxygen, theory 23.0, found 26.8; and percent nitrogen, theory 5.76, found 5.38.

EXAMPLE XII

N-urea glucoside sterate

By following the procedure of Example VI, 100 g. of methyl stearate were converted to 71 g. of crude N-urea glucoside stearate. The fratcion from ethanol weighed 40 g. with a specific rotation $$\left[\ \right]\frac{22°C.}{D} = +19.8°$$

The 31 g. fraction from acetone had a specific rotation of $$\left[\alpha\right]\frac{22°C.}{D} = +16.4°$$

The combined product was purified by adsorption chromatography. The purified material had the following composition: percent carbon, theory 61.47, found 59.74; percent hydrogen, theory 9.83, found 9.36; percent oxygen, theory 22.5, found 24.2; and percent nitrogen, theory 5.63, found 5.37. It melted at 154–160° C. and had a specific rotation of $$\left[\alpha\right]\frac{22°C.}{D} = +13.3°$$

in dimethyl sulfoxide.

We claim:

1. A synthetic detergent composition consisting essentially of from about 2 to 50% of an N-urea glucoside mono-fatty ester and from about 50 to 98% of at least one material selected from the group consisting of water soluble alkali metal phosphates, alkali metal sulfates, and an alkali metal carboxymethyl cellulose.

2. A composition according to claim 1 wherein the N-urea glucoside monoester is selected from the group consisting of N-urea glucoside laurate, N-urea glucoside myristate, N-urea glucoside cocoate, N-urea glucoside palmitate, N-urea glucoside oleate, N-urea glucoside stearate, and N-urea glucoside tallowate.

3. A heavy duty synthetic detergent composition consisting essentially of about 5–30% of an N-urea glucoside mono-fatty ester wherein the acyl moiety contains from 8–24 carbon atoms, about 10–80% of a water soluble alkali metal phosphate, about 5–15% of a water soluble alkali metal silicate, about 15–25% of an alkali metal sulfate, and a minor portion of an alkali metal carboxymethyl cellulose.

4. A light duty detergent composition consisting essentially of from 5–30% of an N-urea glucoside mono-fatty ester wherein the acyl moiety contains from 8–24 carbon atoms, and from 70–95% of an alkali metal sulfate.

5. A detergent composition consisting essentially of a member of the group consisting of a water soluble alkali metal phosphate, a water soluble alkali metal silicate, and a water soluble alkali metal sulfate; and from 2–50% by weight of solids of an N-urea glucoside mono-fatty ester of the general formula:

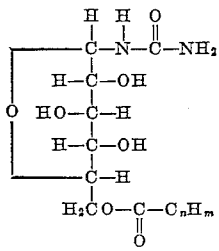

wherein $n$ is an integer having the value of at least 7 and not more than 23 and $m$ is an integer having a value between $2n-3$ and $2n+1$ inclusive.

6. A detergent composition consisting essentially of members of the group consisting of sodium tripolyphosphate, tetrasodium pyrophosphate, sodium metasilicate pentahydrate, sodium sulfate, and sodium carboxymethylcellulose, and 5 to 30% by weight solids of an N-urea glucoside mono-fatty ester of the general formula:

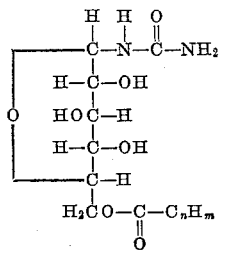

wherein $n$ is an integer having the value of at least 7 and not more than 23 and $m$ is an integer having a value between $2n-3$ and $2n+1$ inclusive.

7. A heavy duty detergent composition consisting essentially of from about 15–25% of an N-urea glucoside mono-fatty ester of the general formula:

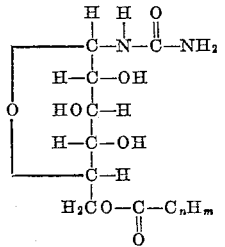

wherein $n$ is an integer having the value of at least 7 and not more than 23 and $m$ is an integer having a value between $2n-3$ and $2n+1$ inclusive, from 35–45% sodium tripolyphosphate, from 5–15% tetrasodium pyrophosphate, from 5–15% sodium metasilicate pentahydrate, from 15–25% sodium sulfate and from 0.5% to 2% sodium carboxymethyl cellulose.

8. A composition according to claim 7 wherein the N-urea glucoside mono-fatty ester is N-urea glucoside laurate.

9. A light duty detergent composition consisting essentially of about 20–30% of an N-urea glucoside mono-ester of the general formula:

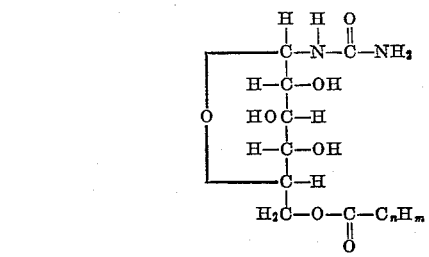

wherein $n$ is an integer having the value of at least 7 and not more than 23 and $m$ is an integer having a value between $2n-3$ and $2n+1$ inclusive, and from 70–80% sodium sulfate.

10. A composition according to claim 9 wherein the N-urea glucoside mono-ester is N-urea glucoside myristate.

References Cited in the file of this patent

UNITED STATES PATENTS 2,738,333 Goldsmith _____ Mar. 13, 1956

FOREIGN PATENTS 496,832 Canada _____ Oct. 13, 1953